United States Patent [19]

Giusti et al.

[11] Patent Number: 5,030,261
[45] Date of Patent: Jul. 9, 1991

[54] TWO STAGE TRANSITION INPUT SECTION FOR DUST COLLECTORS

[76] Inventors: Giambattista Giusti, 50 The Fellsway; Robert W. Duyckinck, 187 Commonwealth Ave., both of New Providence, N.J. 07974

[21] Appl. No.: 383,428

[22] Filed: Jul. 24, 1989

Related U.S. Application Data

[63] Continuation-in-part of Ser. No. 155,446, Feb. 12, 1988, Pat. No. 4,883,510, which is a continuation-in-part of Ser. No. 155,567, Feb. 12, 1988, Pat. No. 4,883,509.

[51] Int. Cl.⁵ ............................................. B01D 46/02
[52] U.S. Cl. ..................................... 55/326; 55/334; 55/341.1; 55/418; 55/444; 55/525
[58] Field of Search ................... 55/128, 129, 307, 308, 55/319, 326, 334, 341.1–341.7, 344, 418, 419, 437, 444, 484, 525

[56] References Cited

U.S. PATENT DOCUMENTS

| 3,378,994 | 4/1968 | Farr | 55/484 X |
|---|---|---|---|
| 3,425,189 | 2/1969 | Haselmayer | 55/418 X |
| 3,739,557 | 6/1973 | Anderson et al. | 55/341.1 X |
| 3,831,350 | 8/1974 | Gilles et al. | 55/418 X |
| 3,831,354 | 8/1974 | Bakke | 55/418 |
| 3,926,595 | 12/1975 | Böckman | 55/341.1 X |
| 4,213,766 | 7/1980 | Wyatt | 55/129 X |
| 4,227,903 | 10/1980 | Gustavsson et al. | 55/302 |
| 4,544,383 | 10/1985 | Haselmaker | 55/418 X |
| 4,655,804 | 4/1987 | Kercheval et al. | 55/341.1 X |

Primary Examiner—Robert Spitzer

[57] ABSTRACT

An improved gas stream inlet construction for industrial dust collectors such as fabric filter type collectors that includes a first transition section in which an incoming high velocity gas stream is reduced in velocity and delivered to a second transition section in a second flow direction substantially perpendicular to the incoming first flow direction and wherein it is further reduced in velocity and is delivered therefrom in a third flow direction substantially perpendicular to both the first and second flow directions.

12 Claims, 5 Drawing Sheets

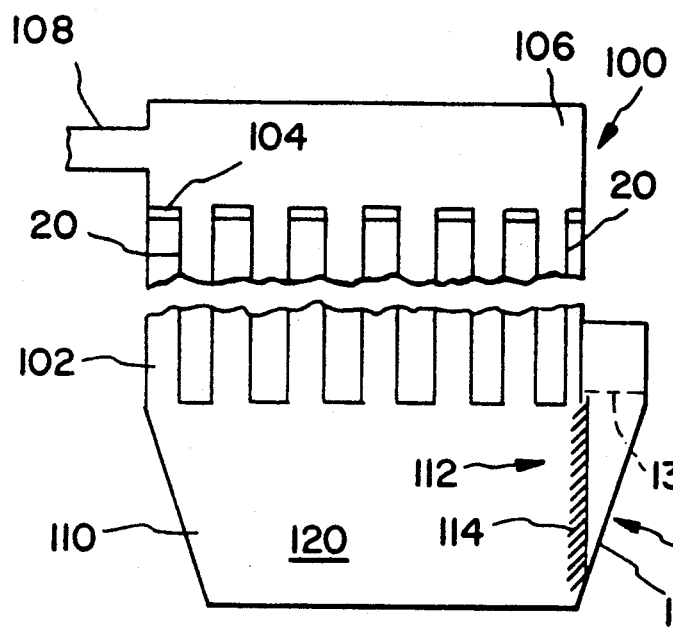
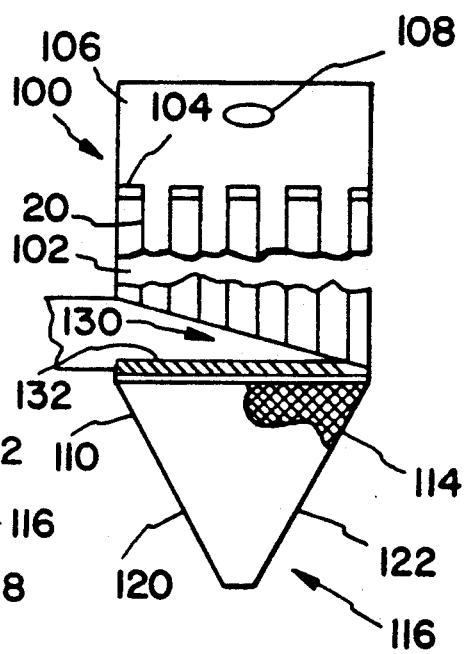
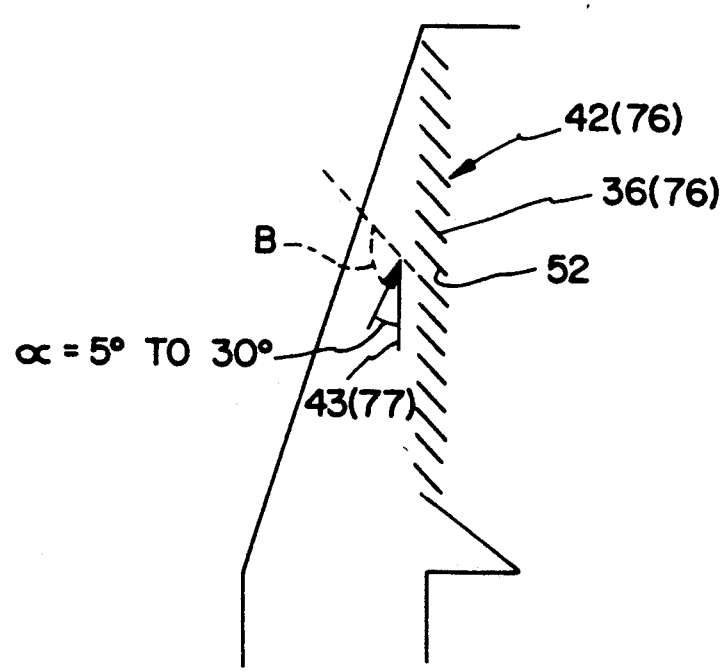

TWO STAGE TRANSITION INPUT SECTION FOR DUST COLLECTORS

This application is a continuation in part of our co-pending application Ser. No. 07/155446 filed Feb. 12, 1988 now U.S. Pat. No. 4,883,509, and Ser. No. 07/155567 filed Feb. 12, 1988 now U.S. Pat. No. 4,883,509.

This invention relates to gas inlet system constructions for dust collecting apparatus and more particularly to apparatus for effecting the controlled introduction and distribution of particulate laden gas streams into industrial fabric filter dust collectors.

BACKGROUND OF THE INVENTION

It has long been recognized that a controlled pattern of equable distribution and a control of velocity of a gas stream at the locus of introduction thereof into dust collecting apparatus can materially contribute to increased efficiency of operation and extended operating life of the gas treating components thereof. One area of preferential concern has been in the industrial gas filtration field, and particularly in the fabric filter dust collector field. One type of such fabric filter dust collector, also called a "baghouse", typically employs a large number of tubular fabric filters suspended from a tube sheet and interposed in the path of a particulate laden gas stream to effect the separation of the particulate matter from the gaseous carrier as the latter traverses the fabric filter media in its passage from the dirty air plenum to the clean air plenum portion of the filter housing. Another type of fabric filter dust collector employs filter media in the form of flat panels rather than tubular filter bags. In both such types of dust collector, a particulate laden gas stream conventionally enters the filter housing either through a breach in a portion of the lower housing wall defining a dust collecting hopper and generally changes direction and flows upwardly toward through the filter media or enters the housing through an upper sidewall portion of the collector housing defining at least a portion of the perimeter of the dirty air plenum. The particulate matter borne by the incoming gas stream normally accumulates on the upstream filter medium surface and, unless removed by dislodgement, results in a progressive increase in pressure drop across the filter media and in a concomitant reduction in the rate of gas flow through the filter media. In order to avoid excessive particulate accumulation on the upstream surface of the filter media, the filter media is periodically cleaned by utilization of various known techniques, such as by pulse jet or reverse flow cleaning or by bag shaking. The outcome of such cleaning operation is that a large part of the accumulated particulates are induced to drop off the filter media surface and fall downwardly, under the influence of gravity, toward and into a collection hopper.

In most industrial fabric filter installations of the type described above, the particulate bearing gas stream approaches the filter through a delivery or conveying conduit having a cross-sectional area sized to effect gas stream displacement at sufficiently high velocities, usually in the order of 3500-4000 feet/min., to assure maintaining the particulate matter in suspended entrained condition therein. Antithetically thereto, it has been recognized that high efficiency—low loss filter operation and increased operating life of the filter components is dependent, at least in substantial part, by an equable distribution of deposited particulates on all the available filter media surfaces; by minimization, if not avoidance, of turbulence in gas flow within the dirty air plenum; by minimization of particulate re-entrainment during or after filter media cleaning and by minimization of localized wear and abrasion of filter components. As is apparent, the high velocity attended operating parameters of the conduit confined approaching particulate bearing gas stream are basically antithetical to the desired optimum parameters of gas stream displacement within the filter housing and the attempted conversion thereof, normally within localized dimensional restraints, conventionally employs transition ducting and the interposition of turning vanes, baffle plates and related gas flow direction and velocity modifiers to the end of hopefully effecting a more equable distribution of the incoming particulate bearing gas steam relative to the available filter media surface and a marked reduction in its approach velocity.

In addition to the foregoing, the obtaining of optimum operating parameters for the introduction of a particulate bearing gas stream into a dust collector is often complicated, if not effectively precluded, by physical restraints at the situs of installation. Among such physical restraints may be a less than adequate area for installation, the presence of duct work, piping, support columns, walls, catwalks and other impediments to ideal installation conditions.

The transition of the shape and velocity of the incoming particulate bearing gas stream to the desirable flow conditions within the fabric filter media housing has been a long standing problem in this art. Many expedients, such as expansion of conduit dimension and the use of baffle plates, turning vanes, flow dividers, perforated plate diffusers, gratings, grids, various types of deflector or distribution plates and the selective location thereof in the path of the incoming gas stream and the like have been suggested to enhance performance in the separation and collection of industrial dusts. Illustrative of some of such varied expedients are U.S. Pat. Nos. 4,227,903; 4,544,383; 4,655,804; 4,213,766; 3,926,595; 3,831,354; 3,831,350; 3,739,557 and 3,425,189. While most of such expedients have resulted in some degree of improved performance, the net results have fallen far short of optimum and the problem of achieving high efficiency and economic operation of industrial fabric filter dust collectors remains a continuing one.

SUMMARY OF THE INVENTION

This invention may be briefly described as an improved inlet construction for industrial fabric filter dust collectors having an operative particle separation zone of predetermined perimetric height, width and depth located within a gas impervious housing and which includes, in its broader aspects, the employment of a pair of sequentially arranged and selectively constituted velocity reducing transition sections in the first of which an incoming high velocity particulate bearing gas stream having a first flow direction is reduced in velocity and delivered through a first exit port into the second transition section in a second flow direction substantially perpendicular to said first flow direction and is therein further reduced in velocity and delivered through a second exit port in a third flow direction that is substantially perpendicular to both said first and second flow directions. The exit port of said second transition section is of markedly enlarged cross-sectional area and is disposed in spaced fluid communicating relation with the particle separation zone through a complementally contoured opening in the gas impervious housing. The second transition section exit port, and preferably also the first transition section exit port, are desirably traversed by selectively located turning vane means. In such broader aspect, the invention further includes control of the angle of gas stream approach to the exit ports in each transition section and the provision of a turbulent flow reduction zone disposed immediately downstream of each of the exit ports to permit dissipation of localized turbulence in the form of eddy currents, vortices and the like induced by passage of the gas stream through the turning vane means disposed therein. In a narrower aspect, the invention further includes the provision of a steeply inclined bottom wall for the turbulent flow reduction zone immediately downstream of the exit port in the second transition section to avoid particulate accumulation thereon and to direct any accumulated particulates thereon into the housing and hopper.

Among the advantages of the subject invention is the provision of improved operation of dust collecting apparatus, and particularly for industrial fabric filter dust collectors, characterized by improved degrees of equable distribution of the particulate laden gas stream relative to the available filter media surface, an improved uniformity of dust loading of the filter elements, higher separation and collection efficiencies, reduced losses and increased service life of filter components. Still other advantages of the subject invention include a permitted enhancement of gas stream velocity reduction and improved degrees of equable distribution of the particulate laden gas stream relative to the available filter media surface for fabric filter dust collectors where such dust collectors are subject to physical restraints at the situs of installation thereof.

The primary object of this invention is the provision of an improved gas stream inlet construction for dust collecting apparatus such as industrial fabric filter type dust collectors.

Other objects and advantages of the subject invention will become apparent from the following portions of this specification and from the appended drawings which illustrate, in accord with the mandate of the patent statutes, presently preferred constructions of industrial fabric filter gas inlet systems incorporating the principles of the invention.

BRIEF DESCRIPTION OF THE DRAWINGS

FIG. 5 is a schematic representation of controlled gas stream approach to a selectively positioned vane assembly and effective diversion thereof;

FIGS. 6A and 6B are schematic front and side elevational representations, partially in section, of a dust collector having a hopper entry gas inlet construction incorporating the principles of this invention;

DESCRIPTION OF THE PREFERRED EMBODIMENTS

Figure 1:
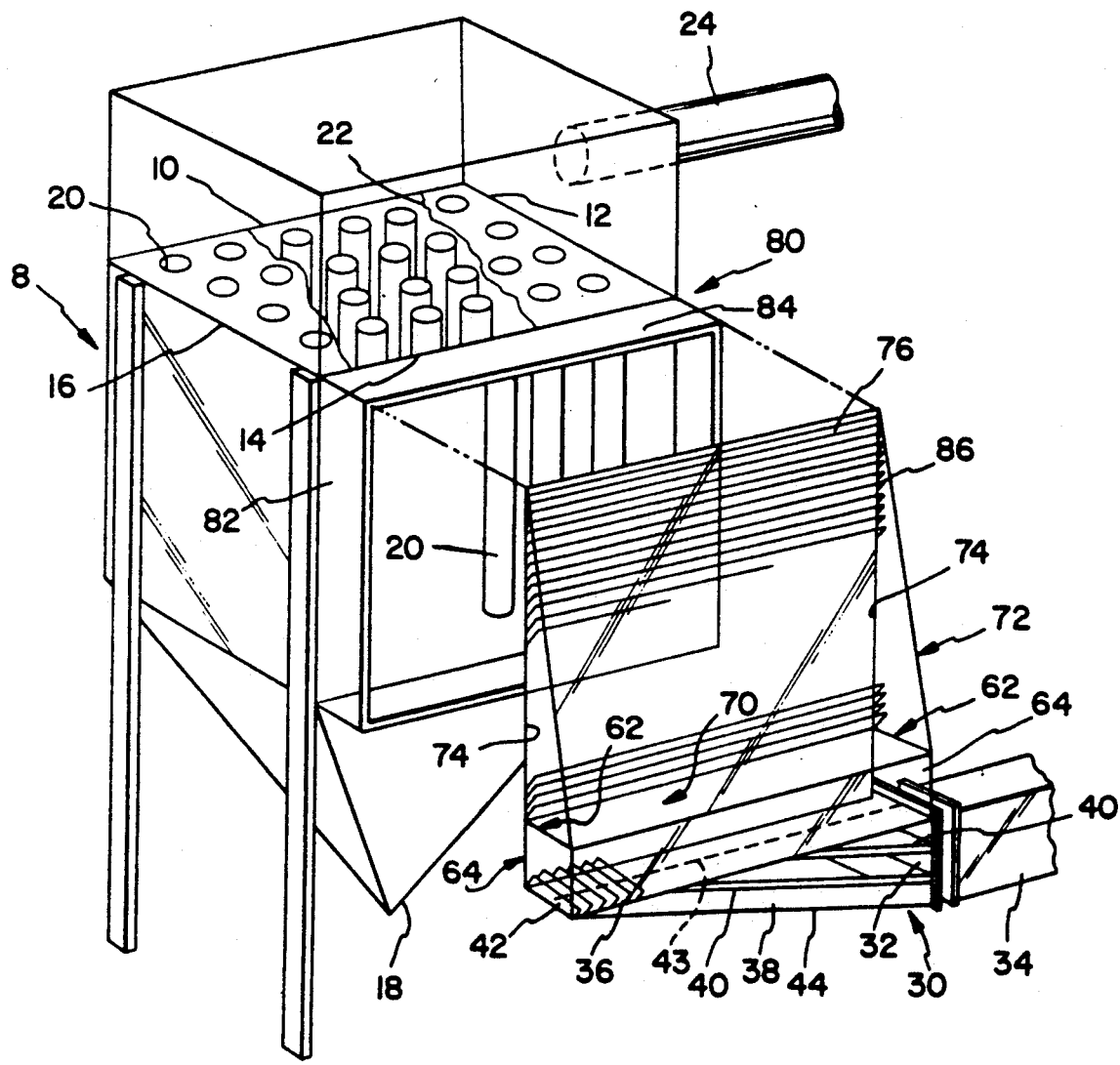
FIG. 1 is a schematic oblique view of components of a conventional fabric filter type of dust collector employing elongate tubular filter bags in association with an exploded view of an improved side wall gas stream inlet assembly embodying the principles of this invention.
Figure 2:
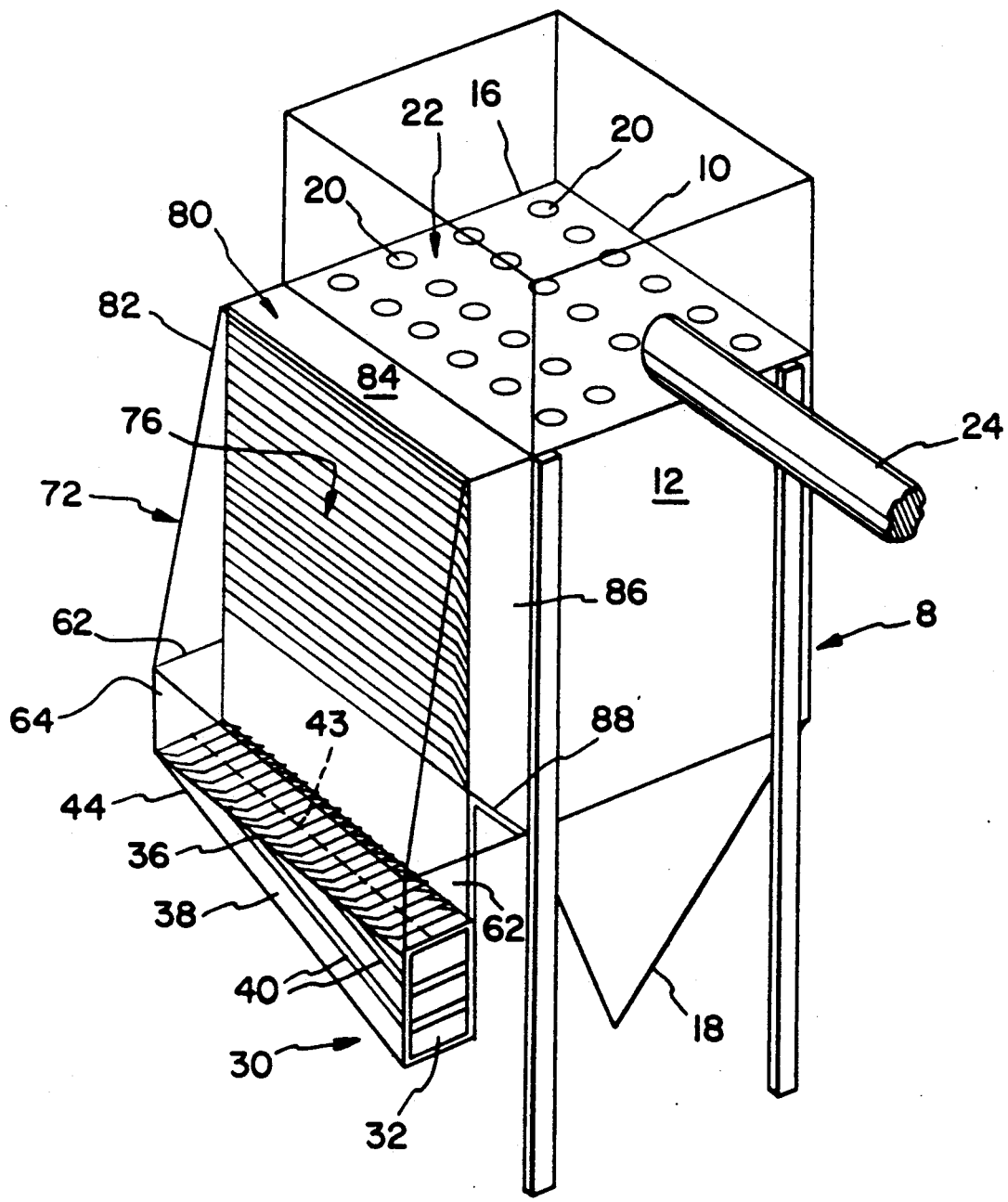
FIG. 2 is a second schematic oblique view of the assemblage of FIG. 1 as viewed from a different direction.
Figure 3:
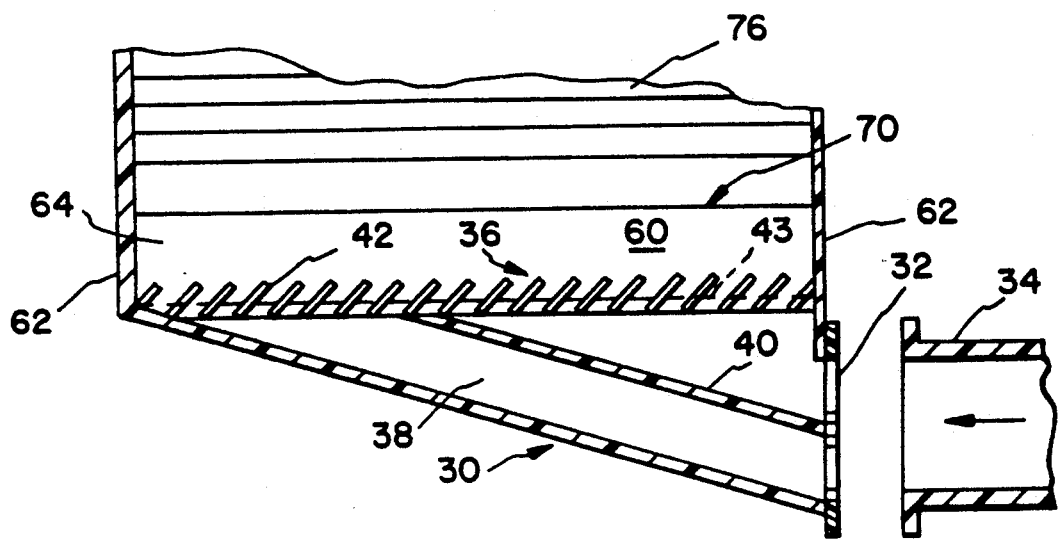
FIG. 3 is an expanded side elevation, partially in section, of a preferred construction for the first velocity reducing transition section incorporated in the assemblage shown in FIGS. 1 and 2.

Referring to the drawings and initially to FIGS. 1 and 2 there is schematically depicted, by way of illustrative example, certain components of a conventional industrial fabric filter dust collector, such as a MikroPulsaire collector as manufactured by MikroPul of Summit, New Jersey, as modified to incorporate the principles of this invention. As there depicted, such a device conventionally includes a rectangular gas impervious housing, generally designated 8, made up of side panels 10, 12, 14 and 16 and dependently terminating in a pyramidal dust collecting hopper 18. Positioned within the housing 8 are a plurality of elongate vertically disposed fabric filter bags 20, conventionally suspended from a tube sheet 22 in uniform spaced relation from each other. Conventionally, the contained volume disposed beneath the tube sheet 22 and externally of the filter tubes 20 is broadly delineated as a "dirty gas plenum". Similarly, the contained volume located above the tube sheet 22 is broadly delineated as a "filtered" or "clean gas plenum", and such is normally vented through a clean gas delivery conduit 24.

In normal filtering operations in such type of collector, a particulate laden gas stream being conveyed at high velocity to the dust collector is commonly introduced into the dirty air plenum through a restricted opening or breach in the wall of the dust collecting hopper 18. Once inside the dirty air plenum the velocity is reduced and such gas is induced to flow upwardly toward and through the filter media 20 and into the clean gas plenum, usually by action of a fan or other prime movant located downstream of the delivery conduit 24. As previously noted and depicted in the above listed patents, turning vanes, baffle plates and other gas flow modifiers are often placed in the path of the incoming gas stream in the hopper 18 in an effort to reduce the gas velocity and to equably distribute the gas over the available fabric filter media surface. As the gas passes through the filter media 20 the particulates entrained therein are separated and accumulate on the upstream (here the external) surfaces of such media. As also previously pointed out, such accumulated particulates are conventionally removed by a cleaning operation such as by pulse jet cleaning, by reverse flow cleaning or by shaking. The particulates dislodged by the cleaning operation fall, under the influence of gravity and usually countercurrent to the direction of gas flow with some resultant re-entrainment, into the dust collection hopper 18.

The improved gas inlet system incorporating the principles of the invention essentially includes a pair of sequentially arranged and selectively constituted velocity reducing transition sections, the first thereof having an entry port sized and shaped to receive a confined high velocity particulate laden gas stream of specific predetermined cross-sectional dimensions and moving along a first flow direction, an exit port of greatly enlarged cross-sectional extent for effecting the delivery of said gas stream, at reduced velocities, into the entry port of a second transition section in a second flow path or direction that is substantially perpendicular, i.e. at an angle of from about 75° to 120°, and preferably from about 75° to 105°, to said first flow direction. Desirably disposed in opening traversing relation within said first transition section exit port are an array of turning vane means to equably distribute and to directionally divert the portions of the gas flow into said second flow path. In a similar manner, the second transition section includes an entry port for receiving the gas stream delivered from the first section exit port along the second flow path. The second transition section includes an exit port of still further greatly enlarged cross-sectional extent traversed by an array of turning vane means for effecting delivery of the particulate bearing gas stream into the collector housing at still further reduced velocity and along a third flow path that is substantially perpendicular i.e., at an angle of about 75° to 120° and preferably about 75° to 105°, to both said first and second flow paths. Disposed immediately downstream of each of the exit ports in the first and second transition sections is a turbulent flow reduction zone to permit dissipation of localized turbulence in the form of eddy currents, vortices and the like induced by gas stream passage through the turning vanes.

In accord with the foregoing, and referring again to the drawings, an improved gas inlet system incorporating the principles of this invention includes a first velocity reducing transition section, generally designated 30, having an entry port 32 sized and shaped to receive a high velocity particulate laden gas stream of a first predetermined cross-sectional area as determined by the dimensions and shape of a conveying duct 34. Conventionally such incoming "dirty" gas stream is conveyed at velocities of about 3500 to 4000 feet per minute to assure maintenance of particulate entrainment and to thereby effectively preclude particle separation in the conveying system and is introduced into the first transition section along a first flow path. Disposed at right angles to the entry port 32 is an exit port 36 of a second and appreciably larger cross-sectional area. In the illustrated embodiment, the width of the entry port 32 and exit port 36 are the same and the increase in exit port area is obtained by markedly increasing the length thereof. Equable gas flow from the entry port 32 toward the full extent of the exit port 36 is directed by a tapering duct section 38, and, if needed for improved equable flow distribution approaching the exit port 36, by one or more flow separating and channeling partitions 40. Desirably disposed within and traversing the full extent of the exit port 36 is a selectively positioned array of turning vane means 42 having a common longitudinal axis 43 in the plane of the port 36 to turn or divert the gas stream to a second flow path disposed substantially perpendicular, i.e. from about 75° to 120°, and preferably from about 75° to 105° to the axis of the first flow path and to equably distribute the portions of the incoming gas flowing upwardly through the exit port 36.

FIG. 5 depicts the desired orientation of a multiple vane array 42 relative to the approaching gas stream. In general an approach angle, $\alpha$, of from 5° to about 30° from the longitudinal axis 43 of the vanes 42 is preferred. Stated otherwise, and as shown in FIG. 5, preferred orientation of the individual vanes in the array 42 is present when the angle of approach, $\alpha$, of the incoming gas stream is at least normal to or forms an obtuse angle $\beta$ with the facing vane surface 52.

Referring back to FIGS. 1 and 2 it will now be apparent that the converging character of the introductory transition section bottom wall 44 relative to the vanes 42 and the resultant progressively decreasing cross-sectional area of the section in the direction of gas flow, together with the channel partitions 40, are directed to providing an equable distribution of gas flow as it approaches the multiple vane array 42 disposed in the exit port 36. In association therewith, the markedly increased area of the exit port 36 as compared to the cross-sectional area of the entry port 32 functions to provide a marked reduction in gas velocity as it is diverted to a second flow path direction that is substantially perpendicular to that of the first flow path as it passes upwardly through the exit port 36.

The passage of the gas stream through, and diversion by, the multiple vane array 42 will inherently produce some degree of localized turbulence in the form of eddy currents, vortices and the like immediately downstream of the turning vane means 42. In order to dissipate and effectively eliminate such localized turbulence, a turbulent flow reduction zone 60, defined by the gas impervious side walls 62 and end walls 64, is located immediately downstream of the turning vane array means 42. Such zone 60 is in the general nature of a closed conduit of limited length and of a cross-sectional extent equal to that of the exit port 36. Such zone 60 functions to permit dissipation of the above described localized turbulence induced by the passage of the gas stream through the first multiple vane array 42 and a further reduction in localized velocity components thereof.

Referring now to FIGS. 1, 2, 3 and 4, the exit end of the first turbulent flow reduction zone 60 serves as the entry port 70 of a second velocity reducing transition section 72 whose exit port 74 is disposed in direct fluid communication with an opening 78 in the housing side wall and with the filter media. The entry port 70 is suitably of a cross-sectional area and contour generally equal to that of the exit port 36 of the introductory transition section 30 and guides the gas flow along its second flow path. Disposed at right angles to such entry port 70 is the exit port 74 of markedly greater cross-sectional area. Desirably, the exit port 74 of the second transition section 72 is of a perimetric contour, here rectangular, sized to conform at least to a substantial portion of the height and width of the opening 78 in the gas impervious housing and fluidly communicates therethrough with the particle separation zone as the latter is defined by the overall height, width and depth of the assemblage of filter bags 20 within the dirty gas plenum. As was the case with the introductory transition section 30, the exit port 74 is desirably traversed by a multiple array of selectively positioned turning vane means 76 to equably distribute and deliver the gas stream along a third flow path that is substantially perpendicular i.e. from about 75° to 120° and preferably from about 75° to 105° to said second flow path and that also is substantially perpendicular to said first gas flow path. As was the case with the above described first transition section, the individual turning vanes in the multiple array thereof have a common longitudinal axis 77 and a gas stream approach angle, $\alpha$, of from 5° to 30° from such longitudinal axis is preferred. As also previously described the vanes in the array are properly positioned when the angle α of approach, of the gas stream is at least normal to or forms an obtuse angle β with the facing vane surface, as depicted in FIG. 5.

In order to effect an equable distribution of the approaching particulate gas stream over the available cross-sectional area of the exit port 74 and at a proper angle of approach as above described, to the array of turning vanes 76, the second transition section 72 is also of tapering character and of progressively decreasing cross-sectional area in the direction of gas flow. If desired, flow splitting channel members of the type shown and described in conjunction with the first transition section 30 may also be included in the transition section 72. The reduced velocity gas stream emanating from the turbulent flow reduction zone 60 exit portion of the first transition section will again be markedly further reduced in velocity as it passes through the second transition section and is again diverted to a third flow path in a direction that is substantially perpendicular to that of both the first and second flow paths as it passes through the second array of turning vanes 76 and is equably distributed over an area conforming at least to a substantial portion of the perimetric contour of the opening in the gas impervious housing that fluidly communicates with the particle separation zone therewithin. As will be apparent to those skilled in this art, local geometry conditions, such as the presence of obstructions, catwalks and the like, may function to limit the area and/or contour of the exit port 74 to something less than that ideally desired to obtain optimum gas flow within the particle separation zone.

Figure 4:
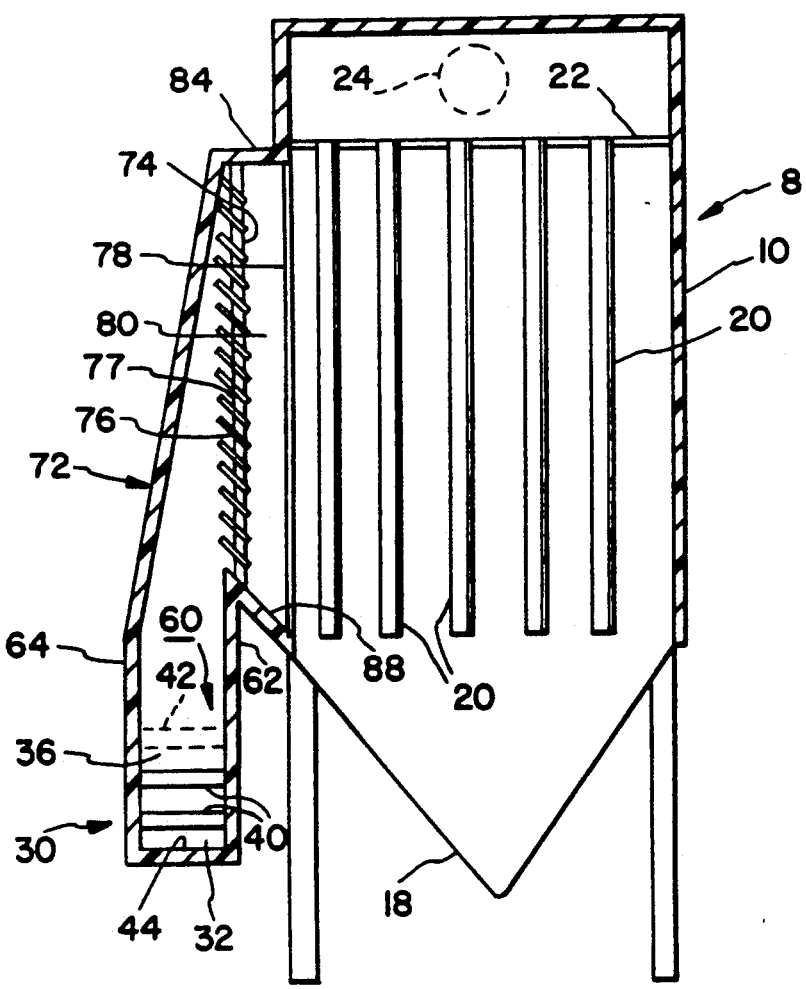
FIG. 4 is a side elevation, partially in section, of the second velocity reducing transition section incorporated in the assembly shown in FIGS. 1 and 2 as modified to accommodate a steeply inclined bottom wall in the second turbulence reduction zone.

Since the passage of the gas stream, albeit at reduced velocity, through the array of turning vanes 76 will be attended by localized turbulence in the form of eddy currents, vortices and the like adjacent the downstream surface thereof, a turbulence reduction zone 80, again in the general form of a short length closed conduit of a cross section generally conforming in perimetic contour with the exit port and formed by walls 82, 84, 86 and 88, is disposed immediately downstream of the grid 76 and intermediate said grid and the particle separation zone within the filter housing. As best shown in FIG. 4 the bottom wall 88 of the turbulence reduction zone 80 may be downwardly inclined to avoid particulate accumulation thereon and to direct any separated and/or accumulated particulates thereon into the housing and/or into the hopper. The downstream end of the turbulence reduction zone 80 fluidly communicates with the opening 78 in the wall of the gas impervious perimetric housing 8 again sized, where permitted, to substantially conform both in shape and dimension with the particle separation zone.

In summary and as will now be apparent, the first transition section operates to turn the incoming high velocity stream through a first substantially right angle turn, i.e., through a turn of 75° to 120°; from a first to a second flow path direction and to concurrently effectively reduce the velocity thereof by an appreciable amount. In addition, the particulate bearing gas stream leaving the first turbulence reduction zone and entering the second transition section along the second flow path will be distributed over the cross section of the entry port of the second transition section in generally equably distributed character. In the second transition section, the particulate bearing gas stream is again changed in direction through another substantial right angle turn, i.e., through a turn of 75° to 120° from the second to a third flow path, direction with the latter being essentially perpendicular to the second gas flow path and also to the first flow path. In addition the second transition section serves to concurrently further reduce the velocity of the gas stream and, after passage through the second turbulence reduction zone, effects the directed introduction thereof into the dust collector in equably distributed relation across the entry aperture in the gas impervious housing thereof.

The above described embodiment of the improved two stage inlet construction incorporating the principles of this invention is readily adapted to effect introduction of the dirty gas stream into the particle separation zone through either the dust collector hopper or through a side wall of the perimetric housing of the dust collector and in a direction in alignment with and essentially perpendicular to the longitudinal center line of the tubular fabric filter media.

FIGS. 6A and 6B are schematically illustrative of a two stage hopper gas entry system incorporating the principles of this invention. As there depicted the fabric filter dust collector 100 includes a dirty air plenum 102 separated by a tube sheet 104 from a clean gas plenum 106 vented by an exhaust duct 108. The dust collecting hopper 110, which is here shown as being of elongate character, includes an enlarged opening 112 at one end thereof traversed by an array of turning vanes 114 of the type described above and oriented relative to the approaching gas stream as heretofore disclosed. Here again the vanes 114 traverse the exit port 112 of a second transition section 116 defined by the transition wall member 118. As best shown in FIG. 6B the transition section 116 also includes conveying hopper side walls 120 and 122 and a first transition section 130 having an exit port 132 traversed by an array of turning vanes.

In the operation of the above described device, the multiple vane array 114 in the second transition section functions to change the flow direction and diffuse the incoming dirty gas stream. After passage through the vanes 114, the gas stream is directed at further decreased velocity, into the hopper 110 in a direction substantially perpendicular to the longitudinal center line of the filter bags 20 but here below the filter bags. Desirably such gas stream will flow across the hopper and will be upwardly diverted toward the particle separation zone, here defined by the overall breadth and depth of the filter bag assemblage, by the induction of the fan disposed downstream of the exhaust duct 108.

Figure 7A:
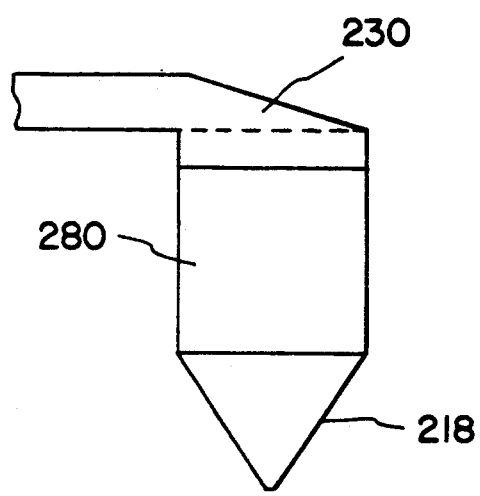
FIGS. 7A and 7B are schematic representations of a dust collector having a top approach gas inlet construction employing the principles of this invention.
Figure 7B:
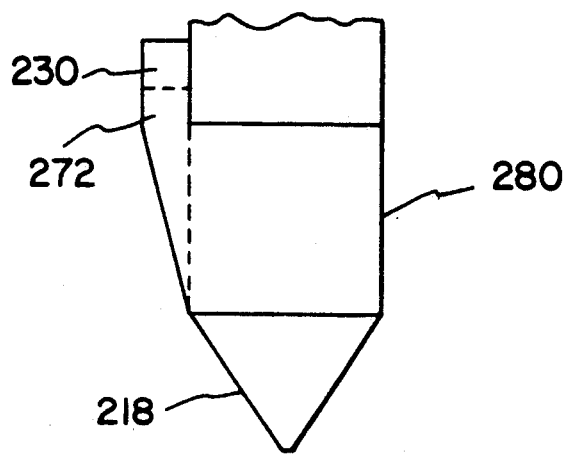
Figure 8A:
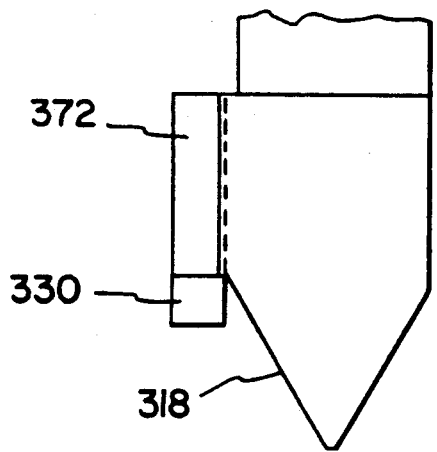
FIGS. 8A and 8B are schematic representations of a dust collector having a side approach gas inlet construction employing the principles of this invention.
Figure 8B:
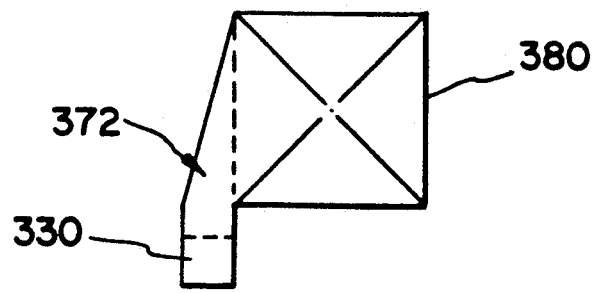

The ready adaptation of the principle of this invention to restrictions placed upon the location of gas stream entry into the dust collector housing are schematically further illustrated in FIGS. 7 and 8. Depending upon possible local geometry restrictions, gas stream entry into a first transition section 230 can be effected at the top of the housing 280 remote from hopper 218 with delivery from the second transition section 272 being effected through an opening 220 in a housing side wall as depicted in FIGS. 7A and 7B. FIGS. 8A and 8B show an alternate approach where the second transition section 372 is disposed at the side of the housing 380 and is fed by a bottom located first transition section 330 adjacent to the hopper 318.

It will also be apparent to those skilled in the art that the converging character of the transition sections could be effected by having the solid base wall thereof disposed parallel to the direction of gas flow and by having the turning vane array means disposed at an angle thereto and other than at right angles to the plane of the entry aperture.

Having thus described our invention; we claim:

1. Apparatus for separating and collecting particulate matter being conveyed in a moving high velocity particulate bearing gas stream of first predetermined cross-sectional area, gas treating means perimetrically defining a particulate separating zone of predetermined height, width and depth, a gas impervious housing perimetrically surrounding said particulate separating zone, gas inlet means for equably distributing and introducing said particulate bearing gas stream at reduced velocity into said particulate separating zone, said gas inlet means comprising, a first velocity reducing transition section having an entry port of substantially said first predetermined cross-sectional area for reception of said high velocity particulate bearing gas stream moving in a first flow direction, an exit port of second and larger predetermined cross-sectional area to deliver the gas stream therefrom at a first reduced velocity and in a second flow direction substantially perpendicular to said first flow direction, a second velocity reducing transition section having an entry port of said second predetermined cross-sectional area to receive the reduced velocity gas stream moving in said second flow direction from said exit port of said first transition section, an exit port of a third and larger cross-sectional area to deliver the gas stream therefrom at a second and further reduced velocity and in a third flow direction substantially perpendicular to both said first and second flow directions.

2. Apparatus as set forth in claim 1 further including selectively positioned gas stream turning vane means disposed in and traversing the exit port in at least one of said first and second transition sections.

3. Apparatus as set forth in claim 2 wherein the angle of gas stream approach to a turning vane is between 5° and 30° from the longitudinal turning vane axis.

4. Apparatus as set forth in claim 1 further including wall means defining a turbulent flow reduction zone located immediately downstream of the exit port of said first transition section to permit dissipation of localized turbulence induced by diversion of the gas stream from said first flow direction to said second flow direction.

5. Apparatus as set forth in claim 4 further including wall means defining a second turbulent flow reduction zone located immediately downstream of the exit port of said second transition section to permit dissipation of localized turbulence induced by diversion of the gas stream from said second flow direction to said third flow direction.

6. Apparatus as set forth in claim 5 wherein said second turbulent flow reduction zone includes an inclined bottom wall to minimize accumulation of particulate matter thereon.

7. Apparatus as set forth in claim 1 further including wall means defining a turbulent flow reduction zone located immediately downstream of the exit port of said second transition section to permit dissipation of localized turbulence induced by diversion of the gas stream from said second flow direction to said third flow direction.

8. Apparatus as set forth in claim 7 wherein said turbulent flow reduction zone includes an inclined bottom wall to minimize accumulation of particulate matter thereon.

9. Apparatus as set forth in claim 1 wherein said second flow direction is disposed at an angle between 75° and 120° relative to said first flow direction.

10. Apparatus as set forth in claim 1 wherein said third flow direction is disposed at an angle between 75° and 120° relative to said second flow direction.

11. Apparatus as set forth in claim 1 wherein said second flow direction is disposed at an angle between 75° and 105° relative to said first flow direction.

12. Apparatus as set forth in claim 1 wherein said third flow direction is disposed at an angle between 75° and 105° relative to said second flow direction.

* * * * *